United States Patent
Brennan

(10) Patent No.: US 10,482,436 B2
(45) Date of Patent: Nov. 19, 2019

(54) SYSTEMS AND METHODS FOR POINT OF SALE DEPOSITS

(71) Applicant: Capital One Services, LLC, McLean, VA (US)

(72) Inventor: Dennis S. Brennan, Pleasanton, CA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/193,145

(22) Filed: Nov. 16, 2018

(65) Prior Publication Data

US 2019/0087796 A1 Mar. 21, 2019

Related U.S. Application Data

(63) Continuation of application No. 16/002,085, filed on Jun. 7, 2018, which is a continuation of application
(Continued)

(51) Int. Cl.
*G06Q 20/02* (2012.01)
*G06Q 20/04* (2012.01)
(Continued)

(52) U.S. Cl.
CPC ....... *G06Q 20/108* (2013.01); *G06Q 20/1085* (2013.01); *G06Q 20/20* (2013.01);
(Continued)

(58) Field of Classification Search
CPC ........ G06Q 20/02; G06Q 20/10; G06Q 20/00; G06Q 20/04; G06Q 20/108; G06Q 20/105;
(Continued)

(56) References Cited

U.S. PATENT DOCUMENTS

| 8,146,805 B1 * | 4/2012 | Davis | G06Q 20/108 235/375 |
| 2006/0155641 A1 * | 7/2006 | Postrel | G06Q 20/10 705/39 |

(Continued)

*Primary Examiner* — Clifford B Madamba
(74) *Attorney, Agent, or Firm* — Finnegan, Henderson, Farabow, Garrett & Dunner, LLP

(57) ABSTRACT

The disclosed embodiments include systems and methods for executing a point of sale deposit. In one embodiment, a system may include one or more memory devices storing software instructions, and one or more processors configured to execute the software instructions to receive deposit information related to a point of sale deposit from a mobile device, and generate a deposit token retaining at least the deposit information and deposit authorization information. The one or more processors may also be configured to transmit the deposit token to the mobile device for displaying a readable code generated based on the deposit token, receive a point of sale deposit authorization notification from the merchant device indicating at least receipt by the merchant device of the deposit token from the mobile device, and transfer funds to a financial service account based on the received deposit information and authorization notification.

20 Claims, 6 Drawing Sheets

Related U.S. Application Data

No. 15/995,634, filed on Jun. 1, 2018, now Pat. No. 10,169,745, which is a continuation of application No. 15/797,644, filed on Oct. 30, 2017, now Pat. No. 10,013,683, which is a continuation of application No. 14/472,641, filed on Aug. 29, 2014, now Pat. No. 9,836,728.

(60) Provisional application No. 61/872,150, filed on Aug. 30, 2013.

(51) Int. Cl.

| | | |
|---|---|---|
| *G06Q 20/08* | (2012.01) | |
| *G06Q 20/10* | (2012.01) | |
| *G06F 17/00* | (2019.01) | |
| *G06F 19/00* | (2018.01) | |
| *G06Q 40/02* | (2012.01) | |
| *G06Q 20/20* | (2012.01) | |
| *G06Q 20/40* | (2012.01) | |
| *G06Q 20/36* | (2012.01) | |

(52) U.S. Cl.
CPC ............ *G06Q 20/36* (2013.01); *G06Q 20/40* (2013.01); *G06Q 40/02* (2013.01)

(58) Field of Classification Search
CPC ........ G06Q 30/00; G06Q 40/00; G06F 17/00; G06F 19/00
USPC .......................................................... 705/39
See application file for complete search history.

(56) References Cited

U.S. PATENT DOCUMENTS

| | | | |
|---|---|---|---|
| 2007/0063017 A1* | 3/2007 | Chen | G06O 20/02 235/379 |
| 2010/0274678 A1* | 10/2010 | Rolf | G06Q 20/04 705/17 |
| 2013/0240622 A1* | 9/2013 | Zhou | G06Q 20/105 235/379 |

* cited by examiner

SYSTEMS AND METHODS FOR POINT OF SALE DEPOSITS

PROVISIONAL CLAIM

This application is a continuation of U.S. patent application Ser. No. 16/002,085, filed, Jun. 7, 2018, which is a continuation of U.S. patent application Ser. No. 15/995,634, filed Jun. 1, 2018, which is a continuation of U.S. patent application Ser. No. 15/797,644, filed Oct. 30, 2017 (now U.S. Pat. No. 10,013,683), which is a continuation of U.S. patent application Ser. No. 14/472,641, filed Aug. 29, 2014 (now U.S. Pat. No. 9,836,728), which claims priority to U.S. Provisional Application No. 61/872,150, filed Aug. 30, 2013, each of which is expressly incorporated herein by reference in its entirety.

TECHNICAL FIELD

The disclosed embodiments generally relate to systems and methods for providing a transaction service, and more particularly, systems and methods for providing point of sale deposits.

BACKGROUND

Some financial service providers are considered "direct banks." Direct banks typically offer the same types of financial accounts to consumers as typical banks, but without the same physical presence. For example, a customer may maintain a checking and savings account with a direct bank; however, the customer will have no physical bank location (e.g., branch) to visit in order to conduct transactions. Customers of direct banks therefore must rely primarily on online (or telephone) services to manage their financial accounts.

Customers of direct banks may also rely on merchant services to transact with their direct bank financial service accounts. For example, merchants often offer customers the ability to make point of sale cash withdrawals along with their merchant transaction. In this way, a customer may be able to receive "cash back" after making a debit card purchase at a retail store. The customer receives cash from the merchant and an amount equal to the received cash is added to the amount eventually transferred to the merchant from the customer's financial account to complete the purchase. Because other options for cash withdrawals are limited, merchant "cash back" services are especially convenient to customers that have a financial account with a direct bank.

Cash deposits, however, remain difficult to complete for customers of direct banks using current technology and infrastructures associated with funds transfers. For example, in order to deposit cash into a financial account held with a direct bank, a customer may have to first deposit the cash into another bank and then transfer the funds to the desired financial account. This process can be inconvenient and may take several days to complete. There is therefore a need for technology capable of performing point of sale deposits.

SUMMARY

Consistent with disclosed embodiments, systems, methods, and computer-readable media are provided for point of sale deposits. According to one disclosed embodiment, a system for executing a point of sale deposit is provided. The system may include one or more memory devices storing software instructions. The system may also include one or more processors configured to execute the software instructions to receive deposit information related to a point of sale deposit from a mobile device, and generate a deposit token retaining at least the deposit information and deposit authorization information, the deposit token generated based on specifications associated with the mobile device and a merchant device. The one or more processors may be further configured to transmit the deposit token to the mobile device for displaying, on an I/O device associated with the mobile device, a readable code generated based on the deposit token. The one or more processors may also be configured to receive a point of sale deposit authorization notification from the merchant device indicating at least receipt by the merchant device of the deposit token from the mobile device, and transfer funds to a financial service account based on the received deposit information and authorization notification.

Consistent with another disclosed embodiment, a system for executing a point of sale deposit may include one or more I/O devices configured to send and receive data, one or more memory devices storing software instructions, and one or more processors configured to execute the software instructions to receive deposit information related to a point of sale deposit at the one or more I/O devices, and send the deposit information to a financial service provider device. The one or more processors may be further configured to receive a deposit token generated by the financial service provider device based on the deposit information, generate a readable code that contains information from the deposit token, and display, via the one or more I/O devices, the readable code for being read by a merchant device.

Consistent with yet another disclosed embodiment, a system for executing a point of sale deposit may include one or more member devices storing software instructions and one or more processors configured to execute the software instructions to initiate a transaction between a customer and a merchant, and receive, from a mobile device, deposit information related to a point of sale deposit, wherein the deposit information includes a deposit token generated by a financial service provider device. The one or more processors may be further configured to send an authorization request to the financial service provider device, the authorization request including the deposit token, receive a notification that the deposit token sent to the financial service provider device corresponds to the deposit token generated by the financial service provider device, and complete the transaction after the customer transfers cash to the merchant to settle the point of sale deposit.

It is to be understood that both the foregoing general description and the following detailed description are exemplary and explanatory only and are not restrictive of the disclosed embodiments, as claimed.

BRIEF DESCRIPTION, OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

In one implementation of the disclosed embodiments, a customer may make a deposit into a financial account in combination with another transaction with a merchant. For example, a customer may pay cash to a merchant, which may trigger funds being transferred into the customer's financial account. Disclosed embodiments may include hardware devices that process these point of sale deposits, thereby providing customers with a new option for depositing funds, improving efficiency of financial account management, and reducing the need for physical service provider locations (e.g., bank branches).

Figure 1:
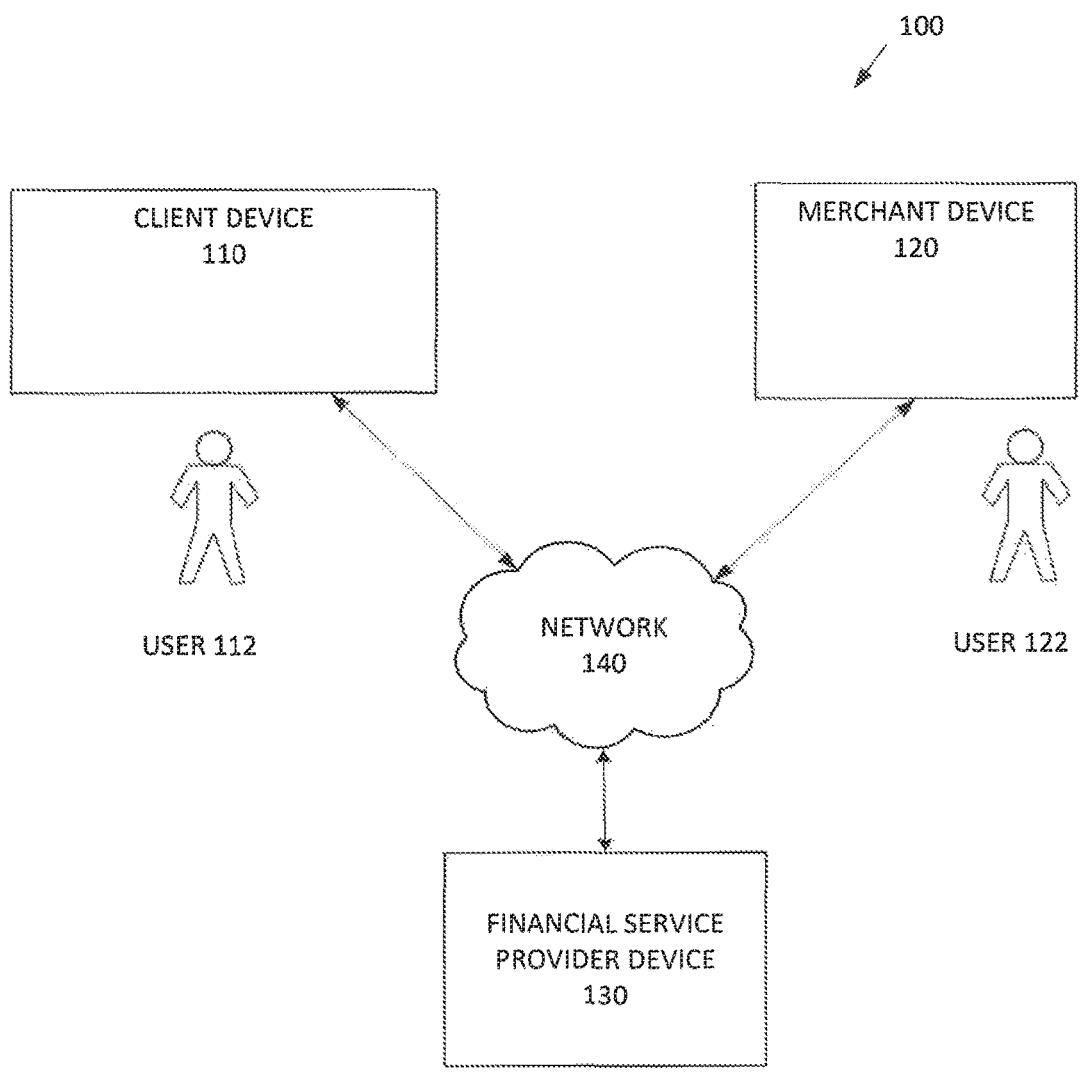
FIG. 1 is a block diagram of an exemplary system, consistent with disclosed embodiments.

FIG. 1 is a block diagram illustrating an exemplary system 100 for performing one or more operations, consistent with the disclosed embodiments. In one embodiment, system 100 may include a client device 110, a merchant device 120, a financial service provider device 130, and a network 140. The components and arrangement of the components included in system 100 may vary. Thus, system 100 may further include one or more of the components of system 100 or other components that perform or assist in the performance of one or more processes consistent with the disclosed embodiments.

Components of system 100 may be computing systems configured to execute a point of sale deposit. As further described herein, components of system 100 may include one or more computing devices (e.g., computer(s), serve (s), embedded systems, etc.), memory storing data and/or software instructions (e.g., database(s), memory devices, etc.), etc. In some embodiments, the one or more computing devices are configured to execute software instructions stored on one or more memory devices to perform one or more operations consistent with the disclosed embodiments. Components of system 100 may be configured to communicate with one or more other components of system 100, including client device 110, merchant device 120, and financial service provider device 130. In certain aspects, users may operate one or more components of system 100 to initiate one or more operations consistent with the disclosed embodiments. For example, client device 110 may be operated by a user 112. User 112 may be an owner/operator of client device 110, such as a customer. In other aspects, the one or more users may be employees of, or associated with, the entity corresponding to the respective component(s) (e.g., someone authorized to use the underlying computing systems or otherwise act on behalf of the entity). For example, merchant device 120 may be operated by a user 122. User 122 may be an employee of a merchant associated with merchant device 120, such as a retail store employee. In other aspects, the one or more users may not be an employee or otherwise associated with the underlying entity. In some aspects, the one or more users may be an entity associated with the respective component.

Client device 110 may be one or more computing devices that are configured to execute software instructions for performing one or more operations consistent with the disclosed embodiments. In one example, client device 110 may be a mobile device (e.g., tablet, smartphone, etc.), a desktop computer, a laptop, a server, a wearable screen or headset, and/or a dedicated hardware device. Client device 110 may include one or more processors configured to execute software instructions stored in memory, such as memory included in client device 110. Client device 110 may include software that, when executed by a processor, performs known Internet-related communication and content display processes. For instance, client device 110 may execute browser software that generates and displays interface screens including content on a display device included in, or connected to, client device 110. The disclosed embodiments are not limited to any particular configuration of client device 110. For instance, client device 110 may be a mobile device that stores and executes mobile applications that provide financial-service-related functions offered by a financial service provider, such as an application associated with one or more financial accounts that a customer holds with financial service provider.

In one embodiment, a user 112 may use client device 110 to perform one or more operations consistent with the disclosed embodiments. In one aspect, user 112 may be a customer or potential customer of a merchant associated with merchant device 120. For instance, user 112 may transact with merchant device 120. In another aspect, user 112 may be a customer of the financial service provider associated with financial service provider device 130. For instance, the financial service provider may maintain a financial service account (e.g., checking account) for user 112.

Merchant device 120 may be associated with a merchant, such as one or more providers of goods and/or services, such as a retailer, etc. Merchant device 120 may include one or more computing systems that are configured to perform computer-implemented processes, such as a server, desktop, laptop, mobile device, embedded system or other dedicated hardware, etc. Further, merchant device 120 may include one or more computing devices configured to process and handle purchase transactions at a physical location of the associated merchant, such as point of sale terminals, local servers, kiosks, barcode scanners, etc., at a retailer location. Merchant device 120 may be configured to perform financial transaction processes, such as receiving, processing, and handling purchase transactions, payment processes, etc. associated with the sale of goods and/or services provided by the associated merchant. In some aspects, merchant device 120 may include computing devices that may include back and/or front-end computing components that store consumer transaction data and execute software instructions to perform operations consistent with the disclosed embodiments, such as computers that are operated by employees of the associated merchant (e.g., back-office systems, etc.).

In certain aspects, a customer associated with client device 110 (e.g., user 112) may purchase goods and/or services from a merchant associated with merchant device 120. In some instances, the customer may use a financial account provided by a financial service provider to pay for the goods and/or services. In other instances, the customer may use another payment method, such as cash.

Financial service provider device 130 may be associated with a financial service provider. The financial service provider may be a bank, credit union, credit card issuer, or other type of financial service entity that generates, provides, manages, and/or maintains financial service accounts for one or more users (e.g., user 112). Financial service accounts may include, for example, checking accounts, savings accounts, credit card accounts, loan accounts, rewards accounts, and any other types of financial service account known to those skilled in the art. Financial service accounts may be associated with electronic accounts, such as a digital wallet or similar account that may be used to perform electronic transactions, such as purchasing goods and/or services online. Financial service accounts may also be associated with physical financial service account cards, such as a debit or credit card that a user may carry on their person and use to perform financial service transactions, such as purchasing goods and/or services at a point of sale terminal (i.e., merchant device 120).

The financial service provider may include infrastructure and components that are configured to and provide financial service accounts and financial service account cards (e.g., debit cards, credit cards, etc.). The financial service provider may also include infrastructures and components that are configured to manage transactions associated with a customer financial service account. In certain aspects, financial service provider device 130 may include one or more computing devices configured to communicate with client device 110 and merchant device 120 to via network 140 to execute processing steps associated with a point of sale deposit. For example, financial service provider device 130 may include one or more computing devices configured to generate deposit tokens, authorize transactions, and settle accounts, as will be described in more detail below.

In certain aspects, the financial service provider associated with financial service provider device 130 may be (or include a service corresponding to that of) a direct bank. The direct bank may maintain financial service accounts with customers, such as checking and savings accounts, in a manner known in the art. The direct bank, however, may not include physical branch locations at which the customers may make transactions, such as financial deposits or withdrawals, typically associated with a bank or similar financial service provider. In other words, management of financial service accounts may take place remotely, such as via network 140.

Network 140 may be any type of network configured to provide communications between components of system 100. For example, network 140 may be any type of network (including infrastructure) that provides communications, exchanges information, and/or facilitates the exchange of information, such as the Internet, a Local Area Network, or other suitable connection(s) that enables the sending and receiving of information between the components of system 100. In other embodiments, one or more components of system 100 may communicate directly through a dedicated communication link(s) (not shown), such as a link between client device 110 and merchant device 120.

It is to be understood that the configuration and boundaries of the functional building blocks of system 100 has been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. For example, merchant device 120 may include financial service provider device 130 for performing operations associated with a private label financial account provided by a merchant associated with merchant device 120. Such alternatives fall within the scope and spirit of the disclosed embodiments.

Figure 2:
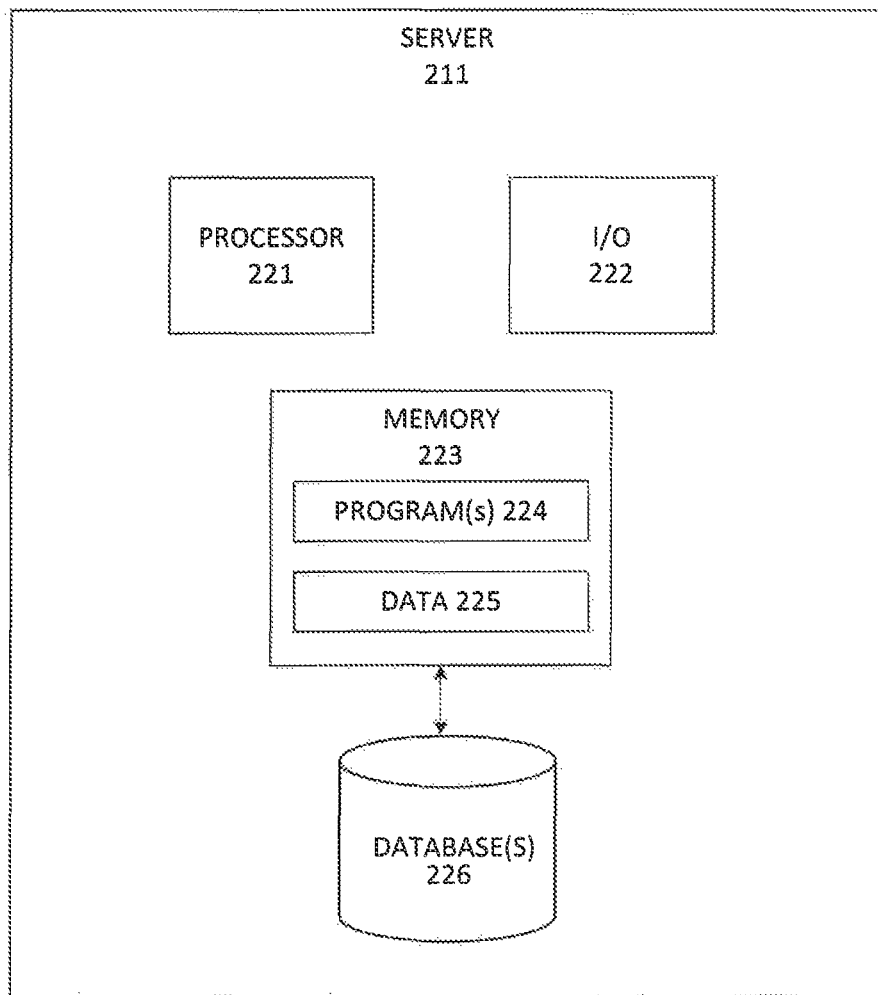
FIG. 2 is a block diagram of an exemplary server, consistent with disclosed embodiments.

FIG. 2 shows an exemplary server 211 for implementing embodiments consistent with the present disclosure. Variations of server 211 may be used by client device 110, merchant device 120, and/or financial service provider device 130.

In one embodiment, server 211 may include one or more processors 221, one or more memories 223, and one or more input/output (I/O) devices 222. According to some embodiments, server 211 may an embedded system or similar computing devices that generate, maintain, and provide web site(s) consistent with disclosed embodiments. Server 211 may be standalone, or it may be part of a subsystem, which may be part of a larger system. For example, server 211 may represent distributed servers that are remotely located and communicate over a network (e.g., network 140) or a dedicated network, such as a LAN. Server 211 may correspond to any of client device 110, merchant device 120, and financial service provider device 130.

Processor 221 may include one or more known processing devices, such as a microprocessor from the Pentium™ or Xeon™ family manufactured by Intel™, the Turion™ family manufactured by AMD™, or any of various processors manufactured by Sun Microsystems. The disclosed embodiments are not limited to any type of processor(s) configured in server 211.

Memory 223 may include one or more storage devices configured to store instructions used by processor 221 to perform functions related to disclosed embodiments. For example, memory 223 may be configured with one or more software instructions, such as program(s) 224 that may perform one or more operations when executed by processor 221. The disclosed embodiments are not limited to separate programs or computers configured to perform dedicated tasks. For example, memory 223 may include a single program 224 that performs the functions of the server 211, or program 224 could comprise multiple programs. Additionally, processor 221 may execute one or more programs located remotely from server 211. For example, client device 110, merchant device 120, and/or financial service provider device 130, may, via server 211, access one or more remote programs that, when executed, perform functions related to certain disclosed embodiments. Memory 223 may also store data 225 that may reflect any type of information in any format that the system may use to perform operations consistent with the disclosed embodiments.

I/O devices 222 may be one or more devices configured to allow data to be received and/or transmitted by server 211. I/O devices 222 may include one or more digital and/or analog communication devices that allow server 211 to communicate with other machines and devices, such as other components of system 100.

Server 211 may also be communicatively connected to one or more database(s) 226. Server 211 may be communicatively connected to database(s) 226 through network 140. Database 226 may include one or more memory devices that store information and are accessed and/or managed through server 211. By way of example, database(s) 226 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. In one aspect, system 200 may include database 226. Alternatively, database 226 may be located remotely from the system 200. Database 226 may include computing components (e.g., database management system, database server, etc.) configured to receive and process requests for data stored in memory devices of database(s) 226 and to provide data from database 226.

Figure 3:
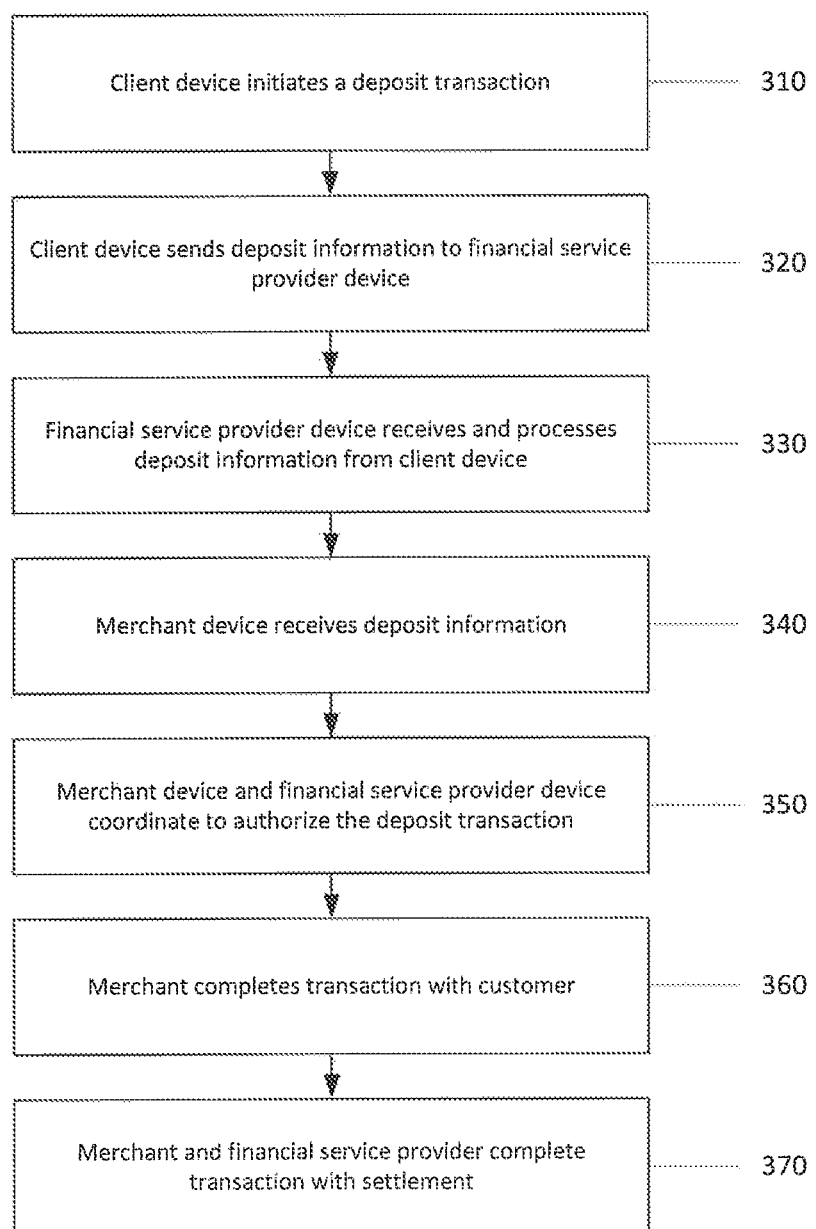
FIG. 3 is a flowchart of an exemplary process for executing a point of sale deposit, consistent with disclosed embodiments.

FIG. 3 is a flowchart of an exemplary process 300 for executing a point of sale deposit, consistent with disclosed embodiments. In some aspects, process 300 may take place in the context of a transaction between a customer associated with client device 110 (e.g., user 112) and a merchant associated with merchant device 120. For example, user 112 may be a customer that makes a purchase at a merchant associated with merchant device 120. User 122 may be an employee of the associated merchant that operates merchant device 120 (e.g., a point of sale device) to execute the transaction with user 112. User 112 may supplement the purchase transaction with a point of sale deposit transaction, which may take place via process 300.

Process 300 may include client device 110 initiating a deposit transaction (step 310). For example, user 112 may operate client device 110 to initiate the deposit transaction. Client device 110 may be a mobile device (e.g., a smart phone), and user 112 may operate the mobile device to execute software instructions (e.g., a mobile application) to initiate the deposit transaction. Client device 110 may send information associated with the initiated deposit transaction to financial service provider device 130 (step 320). In some aspects, initiation of the deposit transaction and transmission of the deposit transaction information to financial service provider device 130 may occur at any time before or during the transaction process between user 112 and the merchant associated with merchant device 120.

Financial service provider device 130 may receive and process the information sent by client device 110 related to the initiated deposit transaction (step 330). After processing the information, financial service provider device 130 may operate in conjunction with client device 110 to transmit the deposit transaction information to merchant device 120. Subsequently, merchant device 120 may receive the deposit transaction information (step 340). In some embodiments, merchant device 120 may use the received deposit transaction information to add the deposit transaction to the purchase transaction. In some aspects, the deposit transaction may be added by the merchant device as a customer debit (i.e., the customer owes the merchant the deposit amount to settle the transaction). Alternatively, the deposit transaction may be added by the merchant device as a customer credit (i.e., the merchant owes the deposit amount to the customer). In other embodiments, the deposit transaction may be the only transaction that takes place between user 112 and merchant device 120.

Merchant device 120 and financial service provider device 130 may work in conjunction to authorize the deposit transaction (step 350). For example, merchant device 120 and financial service provider device 130 may communicate with each other via network 140 to authorize the deposit transaction or otherwise ensure that the deposit transaction is secure and not fraudulent, as further discussed below.

Merchant device 120 may also complete the deposit transaction and any other concurrent transaction (e.g., purchase transaction) (step 360). In some aspects, user 112 may pay the merchant to settle the amount owed for the transaction(s). For example, user 112 may (in addition to paying for any goods or services transactions) provide cash to the merchant in an amount equal to the amount being deposited through the deposit transaction. In other embodiments, user 112 may use another payment method involving, for example, a financial account product (i.e., credit card, debit card, mobile wallet, etc.) to settle the transaction(s). Merchant device 120 may notify financial service provider device 130 that the deposit transaction has been completed (e.g., funds paid to the merchant), which may complete authorization and signal financial service provider device 130 to transfer funds to the customer's financial account. Financial service provider device 130 may notify the customer that the deposit transaction was successfully completed.

After the transaction between the customer and merchant has been completed, the merchant and financial service provider may complete the transaction by settling the amount owed to either entity (step 370). For example, the merchant may transfer to the financial service provider an amount equal to the deposited amount. The amount may be transferred in a manner known in the art, such as through an automated clearing house. In this way, process 300 may allow a user 112 to deposit cash into a financial service account with a financial service provider through a deposit transaction with a merchant.

Figure 4:
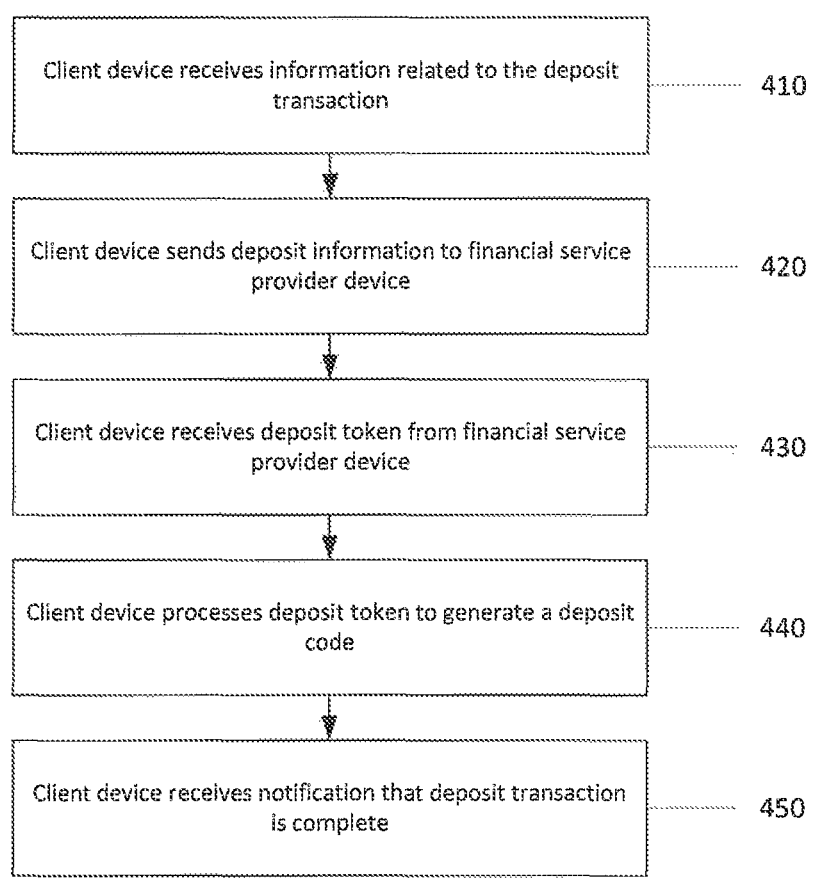
FIG. 4 is a flowchart of an exemplary process for initiating a point of sale deposit, consistent with disclosed embodiments.

FIG. 4 is a flowchart of an exemplary process 400 by which client device 110 may initiate, and/or be used to initiate, a point of sale deposit. User 112 may initiate a point of sale deposit at any time before or during a corresponding transaction with a merchant (e.g., a merchant associated with merchant device 120), For example, a user 112 may initiate a purchase transaction with a merchant and concurrently decide to initiate a deposit transaction with the same merchant. In other words, user 112 may transact with a merchant to purchase an item and make a deposit into a financial service account (e.g., a checking account).

To initiate the deposit transaction, client device 110 may receive information about the deposit (step 410). The deposit information may include details about the financial service account in which the deposit will be made, such as the financial service provider that maintains the financial service account and account identifiers (e.g., account name, type, number, etc.), details about the deposit itself, such as the amount of the deposit, a customer identifier (e.g., customer name, identification number, etc.) and details about the merchant at which the deposit transaction will take place, such as merchant name, location, and/or other merchant identifiers (e.g., store number). According to some embodiments, client device 110 may receive information about the deposit from data stored on a financial account product via, for example, card swipe, card insertion, near field communication, etc.

Client device 110 may receive deposit information as data input by user 112. For example, user 112 may use an I/O device and/or a user interface associated with client device 110 to enter deposit information. In some embodiments, client device 110 may be a mobile device configured to execute software instructions to run a mobile application. The mobile application may be associated with the financial service provider that maintains the financial service account that will receive funds as a result of the deposit transaction. In certain embodiments, the mobile application may be associated with a direct bank. User 112 may operate client device 110 to execute software instructions to run the mobile application. The mobile application may be executed to display an interactive user interface with which user 112 may direct client device 110 to initiate the deposit transaction and prompt user 112 for deposit information. User 112 may enter deposit information, such as by selecting a financial service account to receive the deposited funds and entering the amount to be deposited. Some deposit information, such as financial service provider and other financial service account details may be automatically associated with the initiated deposit, such as via software instructions associated with the mobile application.

User 112 may also input to client device 110 information related to the merchant at which the deposit will be occur. For example, user 112 may be prompted to enter details about the merchant through a user interface associated with client device 110 and the mobile application. In other embodiments, the merchant information may be automatically acquired by client device 110, such as through a GPS location function. Client device 110 may include a GPS device configured to acquire current latitude and longitude of client device 110. For example, client device 110 may include a GPS device that provides geographic location information (not shown). In some embodiments, the GPS device may be a separate device communicatively connected to client device 110. For example, the GPS device may communicate with a GPS satellite navigation system that is used to determine the precise location of client device 110. The GPS device may decode time signal transmissions received from multiple satellites to determine the position of client device 110 using, for example, trilateration techniques performed by a processor executing software stored on a memory device within the GPS device. Client device 110, therefore, may calculate and transmit geographic position information (e.g., location coordinates) associated with client device 110.

In some embodiments, determined location coordinates associated with client device 110 may be stored as deposit information or additional processes may be executed by client device 110 to determine a merchant associated with the determined coordinates. For example, client device 110 may execute a software process to determine a specific merchant from a database of possible merchants that is located at the determined location coordinates. The determined merchant and any associated information may be stored, marked, and/or labeled as deposit information.

After the deposit information has been received by client device 110, client device 110 may send the received deposit information to financial service provider device 130 (step 420). For example, client device 110 may execute software instructions to send the received deposit information to financial service provider device 130 via network 140. In the embodiment in which client device 110 is a mobile device, network 140 may include a mobile network (i.e., a cellular data network). Financial service provider device 130 may be a computing device (e.g., a server) configured to receive and process (or forward the information to another computing device for processing) the deposit information.

As will be described in more detail below, financial service provider device 130 may execute a process to generate a deposit token associated with the deposit transaction. In process 400, client device 110 may be configured to receive the generated deposit token (step 430). For example, financial service provider device 130 may send the generated deposit token via network 140, which may be received by client device 110. The generated deposit token may be a representation of the deposit transaction, such as a unique alphanumeric identifier associated with the deposit information.

Client device 110 may execute software instructions to process the received deposit token such that the deposit token may be transmitted to merchant device 120. In some embodiments, client device 110 may process the deposit token to generate a deposit code (step 440). The deposit code may be any type of representation of data that is in a form convenient for use with merchant device 120, such as a readable code. For example, the deposit code may be a barcode that is configured to be displayed by a display device associated with client device 110. In the embodiment in which client device 110 is a mobile device, the barcode may be displayed on a mobile device screen. The barcode may be encoded with the deposit information (e.g., the deposit token). As will be described in more detail below, merchant device 120 may read the deposit code (e.g., scan the barcode with a barcode scanner) such that the requisite deposit information may be transmitted to merchant device 120.

According to the steps of process 400, client device 110 may initiate a point of sale deposit transaction. Process 400 includes steps that initiate the deposit transaction with financial service provider device 130 (e.g., step 420) and arrange for the deposit transaction to be initiated with merchant device 120 (e.g., step 440). In this way, additional processes may be executed to carry out and complete the deposit transaction. In some embodiments, client device 120 may subsequently receive a notification that the deposit transaction is completed (step 450).

Figure 5:
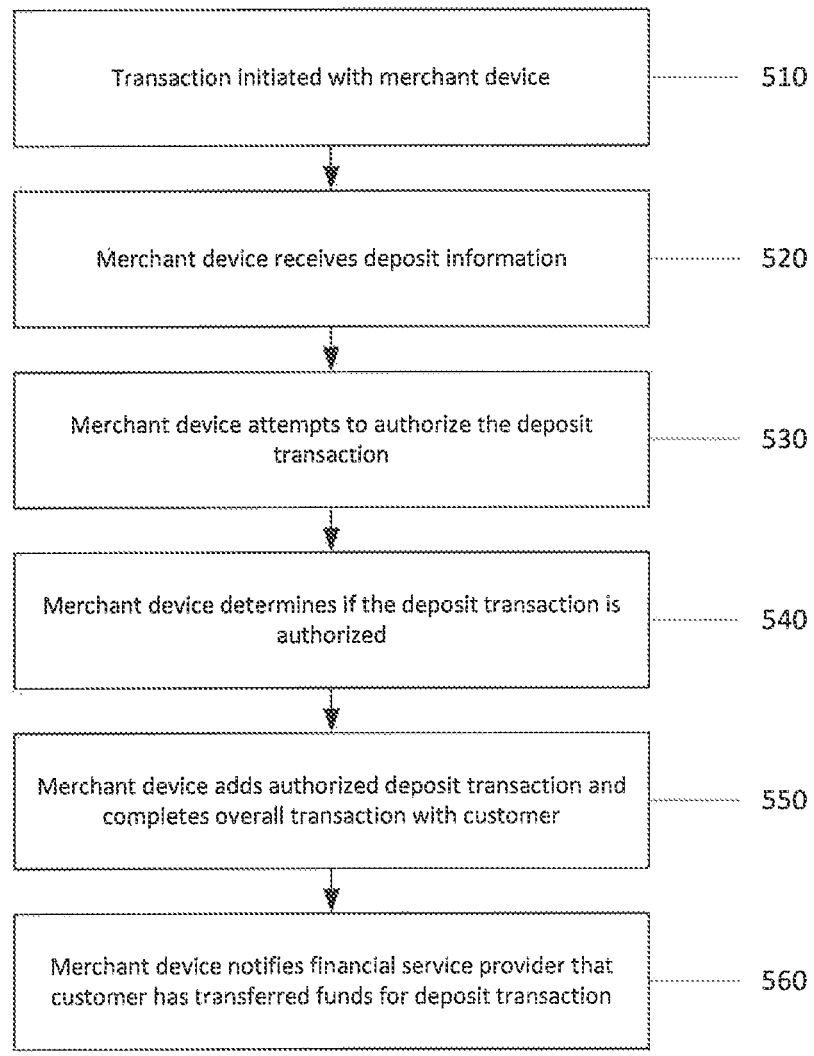
FIG. 5 is a flowchart of an exemplary process for executing a point of sale deposit, consistent with disclosed embodiments.

FIG. 5 is a flowchart of an exemplary process 500 by which merchant device 120 may execute, and/or be used to execute, a point of sale deposit transaction. In certain aspects, merchant device 120 may execute software instructions to carry out some or all of the steps of process 500. As described above with respect to process 400, process 500 may be executed in the context of a financial transaction between a customer (e.g., user 112) and a merchant (e.g., the merchant associated with merchant device 120).

Consistent with disclosed embodiments, a transaction may be initiated with merchant device 120 (step 510). The initiated transaction may include a deposit transaction, such as the deposit transaction described above with respect to process 400. The deposit transaction may be a part of, supplemental to, or take place individually from another transaction between the merchant and the customer. For example, the deposit transaction may be a part of a purchase transaction between a customer and a retailer merchant. In these exemplary embodiments, the purchase transaction may be initiated with merchant device 120 in a typical manner known in the art. For example, merchant device 120 may be a point of sale register with a barcode scanner and user 122 (e.g., a merchant employee) may scan a barcode associated with the item to be purchased by the customer with the barcode scanner. Merchant device 120 may execute software instructions to decode the barcode to, among other things, identify an amount owed by the customer to the merchant for the item. In this way, the transaction may be initiated with merchant device 120.

It should be understood that, in some embodiments, the transaction between the customer and the merchant may consist only of a point of sale deposit transaction. In these embodiments, step 510 may include other steps to initiate the transaction, such as receiving data input from user 122 to signal that a deposit transaction is being initiated. In other embodiments, step 510 may not be included in process 500, and step 520, described in more detail below, may initiate the deposit transaction with merchant device 120.

Process 500 may further include merchant device 120 receiving deposit transaction information (step 520). The deposit transaction information may include information from client device 110 and/or financial service provider device 130. For example, in the embodiment in which client device 110 is a mobile device that generates a barcode from a deposit token received from financial service provider device 130 (e.g., step 440 of process 400), merchant device 120 may receive deposit information by decoding the information encoded by the barcode. For example, user 122 may use a barcode scanner to scan a barcode generated and displayed by client device 110. Merchant device 120 may execute software instructions to extract the deposit information from the encoded information. In this way, merchant device 120 may store and/or process the deposit information to continue process 500.

While a barcode has been described in the above exemplary embodiment, it should be understood that any method or means of relaying encoded deposit information may be used (e.g., QR code, word or picture recognition software, etc.). In other embodiments, merchant device 120 may receive deposit information in a manner other than through a readable medium. For example, instead of a barcode, client device may generate an alphanumeric code as the deposit code. User 122 may enter the alphanumeric code to merchant device 120, such as through an I/O device and/or a user interface. Merchant device 120 may be programmed with software instructions (e.g., a software application) configured to process the alphanumeric code to determine the deposit transaction information associated with that particular alphanumeric code. In still other embodiments, communication signals between client device and merchant device 120 may be used, such as wireless signals, Bluetooth, etc.

In some embodiments, merchant device 120 may receive deposit information from a source other than client device 110. In some aspects, the deposit information received from a source other than client device 110 may include information in addition to information from client device 110. For example, user 112 may inform user 122 that they wish to initiate a deposit transaction. User 122 may input information through an I/O device and/or a user interface, such as an amount that will be deposited through the deposit transaction. In other embodiments, merchant device 120 may receive the deposit information from user 112. User 112 may enter deposit information into an I/O device and/or user interface associated with merchant device 120. User 112 may enter the deposit information manually (e.g., entering an amount via a keypad) and/or automatically (e.g., swiping a debit card to transmit financial service account information). In any instance, merchant device 120 may store and/or process the received deposit information to continue process 500.

Merchant device 120 may also seek to authorize the deposit transaction with the financial service provider (step 530). For example, merchant device 120 may send an authorization request to financial service provider device 130. Merchant device 120 may send the authorization request via network 140. In some embodiments, the authorization request may include transmitting the deposit token to financial service provider device 130.

As will be described in more detail below, financial service provider device 130 may receive the authorization request and make a determination based on the information in the request and other information about the deposit transaction (e.g., information received from client device 110) regarding whether the deposit transaction is authorized to continue. In other embodiments, merchant device 120 may attempt to authorize the deposit transaction by prompting user 112 or user 122 to enter additional information. For example, merchant device 120 may request that user 112 swipe a debit card associated with the financial service account to which funds are to be deposited.

Merchant device 120 may also determine whether the deposit transaction has been authorized (step 540). For example, merchant device 120 may receive a notification from financial service provider device 130 with information related to the result of the authorization determination. In some embodiments, the notification may include deposit information (e.g., deposit amount and a customer identifier, such as the customer's first name). In addition, the notification may include a verification code. The verification code may be a unique identifier (e.g., alphanumeric code) generated by financial service provider device 130 and related to the deposit transaction.

In other embodiments, merchant device 120 may determine authorization through information received from user 112 and/or user 122. For example, merchant device 120 may execute software instructions to process information from a debit card swiped by user 112 to determine if the deposit transaction is authorized (e.g., deposit information received from client device 110 matches information obtained from the debit card). In these exemplary embodiments, process 500 may include an additional step of sending a notification to financial service provider device 130 that the deposit transaction was authorized.

If merchant device 120 receives authorization to continue the deposit transaction, merchant device 120 may add the deposit transaction and complete the overall transaction with the customer (step 550). For example, merchant device 120 may add the amount of the deposit (extracted from deposit information) to an amount owed to the merchant associated with merchant device 120. In the embodiment in which the deposit transaction is part of an overall transaction that includes a purchase transaction, the amount of the deposit may be added to the amount of the purchase(s) to determine a total amount that is owed to the merchant by the customer (e.g., user 112).

Merchant device 120 may receive information indicating that the customer has paid the amount owed to the merchant. For example, the customer (e.g., user 112) may pay cash to the merchant and user 122 may enter the amount paid by the customer to merchant device 120. Merchant device 120 may subsequently transmit a notification to financial service provider device 130 notifying the financial service provider that the customer has transferred the funds (e.g., cash) to the merchant for the deposit transaction (step 560). The notification may include, for example, the deposit token and the verification code, which may allow financial service provider device 130 to complete authorization of the transaction.

Merchant device 120 may execute additional software instructions to complete the transaction, which may include producing a receipt. After process 500 is finished, the transaction between the customer and merchant may be completed and the funds previously held by the customer may be available or eventually become available (such as after settlement between the merchant and financial service provider) as funds deposited into the financial service account.

Figure 6:
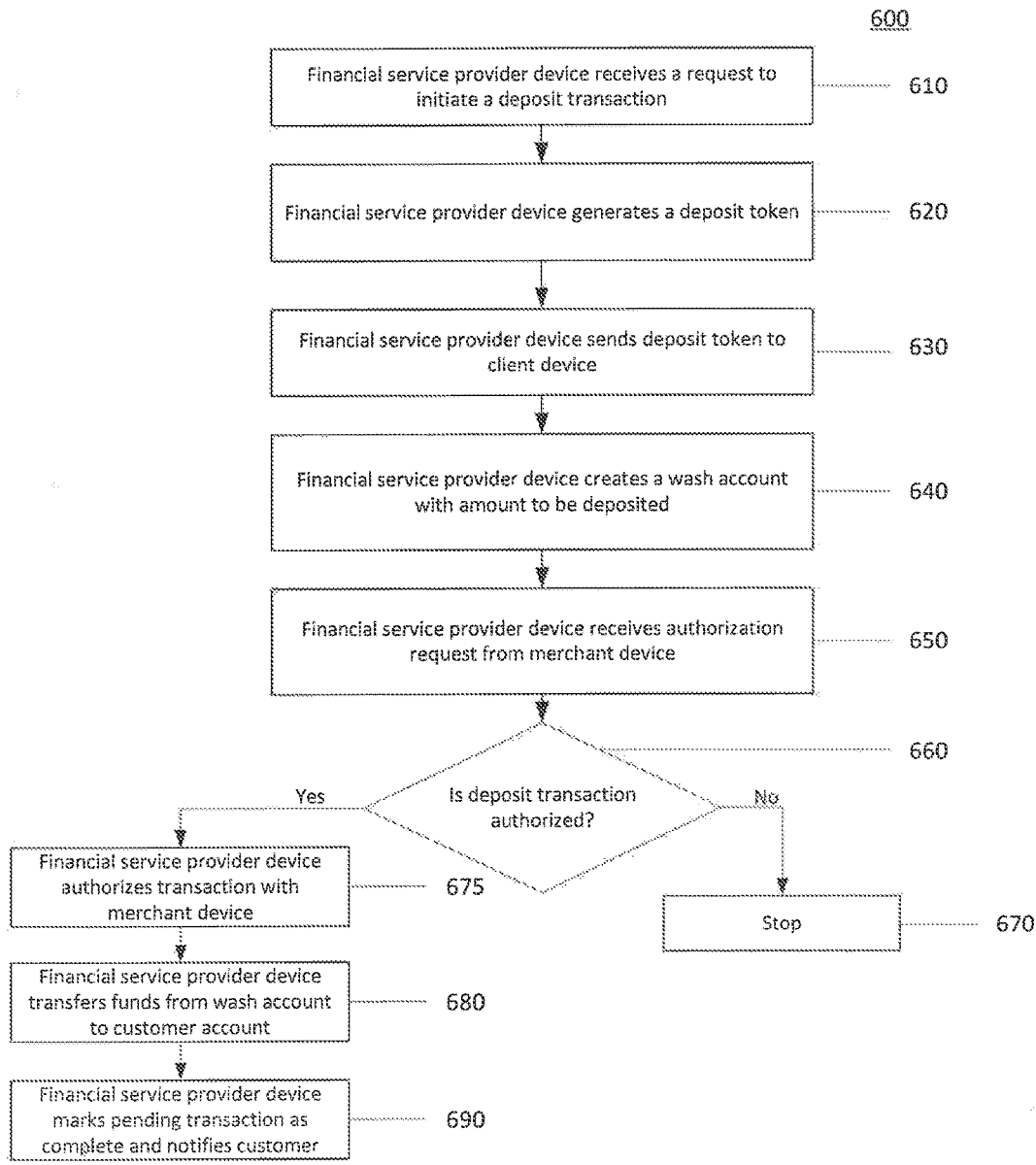
FIG. 6 is a flowchart of an exemplary process for executing a point of sale deposit, consistent with disclosed embodiments.

FIG. 6 is a flowchart of an exemplary process 600 by which financial service provider device 130 may execute a point of sale deposit. Process 600 includes steps that, when executed in conjunction with some or all of the steps of processes 400 and 500 described above, complete a point of sale deposit by a customer associated with client device 110 with a merchant associated with merchant device 120.

Process 600 includes financial service provider device 130 receiving a request to initiate a deposit transaction and/or deposit information (step 610). Step 610 may correspond to step 420 of process 400, in that financial service provider device 130 may receive deposit information sent from client device 110. Financial service provider device 130 may use the received deposit information to initiate the deposit transaction. For example, financial service provider device 130 may be a computing device (e.g., an embedded system or other dedicated hardware) configured to execute software instructions to read and/or decode the received deposit information and associate the deposit transaction with a customer profile. For example, financial service provider device may determine the customer and financial service account to which funds are to be deposited, such as by searching a customer profile database to match received identifiers (e.g., account number).

Financial service provider device 130 may also process the deposit information to generate a deposit token (step 620) For example, financial service provider device 130 may include a computing device configured to execute software instructions to run an application programming interface (API) to generate the deposit token. As described above, in some embodiments, the deposit token may be a unique alphanumeric identifier associated with the deposit information. The deposit information associated with the generated deposit token may be stored by financial service provider device 130, such as in a system of record. In other embodiments, the deposit token may additionally or alternatively include encoded deposit information received from client device 110 (e.g., deposit amount, customer information, and/or merchant information) and/or additional information from the financial service provider. After the deposit token is generated, financial service provider device 130 may transmit the deposit token to client device 110 (step 630), such as for use in processes 400 and 500.

In addition to generating the deposit token, financial service provider device 130 may continue processing of the initiated deposit transaction by creating a pending transaction. Financial service provider device 130 may create a wash account that contains an amount equal to the deposit amount (step 640). In some aspects, the wash account may be an intermediary financial account or other temporary placeholder for the funds to be deposited into the customer's financial service account. Financial service provider device 130 may wait for additional information before continuing processing of the deposit transaction.

Financial service provider device 130 may receive the above-mentioned additional information in the form of an authorization request from merchant device 120 (step 650). Step 650 may correspond to step 530 of exemplary process 500. For example, merchant device 120 may seek to authorize the deposit transaction by sending the authorization request with deposit information (e.g., the deposit token and wash account details) through network 140. In some aspects, the authorization request may be a notification sent and received through existing payment channels between the merchant and financial service provider. For example, the request may be sent and received via credit/debit card processing protocols, with the deposit information encoded into the communication, such as in a discretionary data field. In some embodiments, authorization requests sent between merchant device 120 and financial service provider device 130 may include processing through an API. In any instance, financial service provider device 130 may process the received authorization request to determine if the deposit transaction should be authorized (step 660). For example, financial service provider device 130 may determine if the received deposit information (from merchant device 120) matches the deposit information associated with the pending transaction (e.g., received deposit token matched generated deposit token). In addition, financial service device 130 may determine a merchant associated with merchant device 120 and attempt to match the determined merchant to a merchant associated with a merchant location received from client device 110. If the merchants match, the deposit transaction may be authorized.

If the deposit transaction is not authorized (step 660; NO), process 600 may stop (step 670). In some embodiments, financial service provider device 130 may leave the deposit transaction pending to await another authorization request. If, after a certain period of time, another request is not received, the pending deposit transaction may expire.

If the deposit transaction is authorized (step 660; YES), financial service provider device 130 may authorize the transaction with merchant device 120 (step 675). For example, financial service provider device 130 may transmit a notification to merchant device 120. As described above with respect to step 540 of process 500, the notification may include deposit information and a verification code. After transmitting the notification, financial service provider device 130 may receive a notification in return from merchant device 120. The notification from merchant device 120 may include the deposit token and the verification code, for example, which may inform the financial service provider that the customer has transferred funds (e.g., cash) in the amount of the deposit to the merchant.

Receipt of the return notification from merchant device 120 may complete authorization of the deposit transaction. With the transaction authorized, financial service provider device 130 may transfer the funds in the wash account to the chosen customer financial service account (step 680). In this way the wash account may be "settled," and the deposited funds may become available to the customer in the receiving account. Financial service provider device 130 may complete the deposit transaction by marking the pending transaction as complete and notifying the customer that the transaction is complete (step 690). In some embodiments, financial service provider device 130 may transmit a message (e.g., sms text message, push notification, email) to client device 110 to notify the customer.

Additional processes may occur between financial service provider and the merchant to settle the amount owed to either entity. For example, the financial service provider may receive funds from the merchant to settle the amount of the deposit that was given to the merchant by the customer. Settlement may occur in a manner known in the art, such as through an automated clearing house. Either or both of merchant device 120 and financial service provider device 130 may execute steps that lead to settlement. If any of the steps of the above-described processes fail (e.g., network outage, hardware failure, fraud detection, etc.), the process(es) may be stopped. If the deposit transaction is already pending at the point of stoppage, the deposit transaction may remain pending and wait for the respective process to complete. If, after a certain period of time, the deposit transaction process fails to continue or complete, the pending transaction may expire and the deposit cancelled.

In addition, it should be understood that other entities, such as the merchant's financial service provider, payment processors, etc., may include devices that execute one or more of the steps of the processes described herein.

Further, it should be understood that any of client device 110, merchant device 120, and financial service provider device 130, while represented as a single device, may be multiple devices that work individually or in concert to execute the steps of the processes described herein. For example, financial service provider device may include a computing device that includes the API that generates and transmits the deposit token and a separate computing device that authorizes the deposit transaction and settles the wash account. Other arrangements and configurations of devices may be possible.

Using the above-described processes, a customer of a financial service provider may execute a point of sale deposit in the form of a mobile cash deposit. The deposit transaction may be used to deposit funds (e.g., cash) to a financial service account using client device 110 in coordination with a merchant device 120. In this way, the disclosed systems may provide more efficient deposit transactions, allowing customers to make deposits while also completing other transactions.

In certain aspects, the disclosed embodiments provide incentives for merchants to work with financial service providers to present point of sale deposits to customers. For example, a merchant may partner with a financial service provider to offer point of sale deposits at their merchant locations.

While the above processes have been described with regard to point of sale deposits at merchants, it should be understood that similar processes may be used for other financial transactions. For example, consistent with disclosed embodiments, system 100 may be used to make bill payments in cash. In this example, all process steps may be the same or similar as described above, however, instead of transferring funds from the wash account to a financial service account associated with the user, financial service provider device 130 may transfer the funds to a third-party to pay the bill.

Other alternatives may include replacing merchant device 120 with another device, such as a bank branch device located on or near the merchant's premises. The bank branch device may be associated with a financial service provider (which may not be the same financial service provider with which the customer has a financial service account). In this way, the customer may make a deposit into their financial service account at a bank branch (even though the bank branch may not be their financial service provider).

In another example, merchant device 120 may be an ATM machine. The ATM machine may be configured to operate in substantially the same manner as merchant device 120. For instance, the ATM machine may be capable of reading a barcode generated by client device 110, authorizing the deposit transaction with financial service provider device 130, and receiving the cash to complete the transaction.

The exemplary disclosed embodiments describe systems and methods for point of sale deposits at merchant locations. The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A system for executing a point-of-sale deposit, comprising:
   one or more memory devices storing software instructions; and
   one or more processors configured to execute the software instructions to perform operations comprising:
      receiving, from a mobile device associated with a customer, point-of-sale deposit information;
      encoding the point-of-sale deposit information according to specifications associated with (i) the mobile device and (ii) a merchant device associated with a merchant;
      transmitting the encoded point-of-sale deposit information to the mobile device for transmission to the merchant device;
      receiving, from the merchant device, a completion notification indicating that the merchant received funds for deposit from the customer at a point of sale, wherein the point-of-sale deposit is completed concurrently with a purchase transaction between the customer and the merchant; and
      transferring funds to the financial service account held by the customer based on the completion notification.

2. The system of claim 1, wherein the point-of-sale deposit information includes at least one of an amount to be deposited, an account identifier, or a customer identifier.

3. The system of claim 2, the operations further comprising creating a pending deposit transaction based on the point-of-sale deposit information by generating a wash account containing an amount based on the amount to be deposited.

4. The system of claim 2, wherein the point-of-sale deposit information includes merchant information identifying the merchant.

5. The system of claim 4, wherein the merchant information includes a merchant location determined by the mobile device.

6. The system of claim 4, the operations further comprising authorizing completion of the point-of-sale deposit based at least in part on the merchant information.

7. The system of claim 5, the operations further comprising authorizing completion of the point-of-sale deposit based at least in part on a comparison of (i) a known location of the merchant and (ii) the merchant location determined by the mobile device.

8. The system of claim 6, wherein authorizing completion of the point-of-sale deposit includes confirming the merchant information corresponds to a merchant identified based at least in part on an authorization request.

9. The system of claim 7, wherein authorizing completion of the point-of-sale deposit includes transmitting an authorization notification to the merchant device.

10. The system of claim 1, the operations further comprising receiving an indication that a financial provider system associated with the financial service account received funds from the merchant for settling the point-of-sale transaction.

11. A system for executing a point-of-sale deposit on a mobile device, comprising:
receiving point-of-sale deposit information including an amount to be deposited;
transmitting the point-of-sale deposit information to a financial service provider device;
receiving, from the financial service provider device, encoded point-of-sale deposit information;
generating, based on the encoded point-of-sale deposit information, a readable code; and
displaying the readable code for completing the point-of-sale deposit between a customer and a merchant, wherein the point-of-sale deposit is completed concurrently with a purchase transaction between the customer and the merchant.

12. The system of claim 11, wherein the mobile device includes a mobile application for executing the method.

13. The system of claim 11, wherein the readable code contains the encoded point-of-sale deposit information.

14. The system of claim 13, wherein the code is a scannable code.

15. The system of claim 11, wherein the point-of-sale deposit information includes at least one of an account identifier or a customer identifier.

16. The system of claim 11, wherein the point-of-sale deposit information includes information identifying the merchant.

17. The system of claim 16, wherein the merchant information includes a merchant location determined by the mobile device.

18. A system for executing a point-of-sale deposit, comprising:
receiving, from a mobile device associated with a customer, encoded point-of-sale deposit information;
transmitting the encoded point-of-sale deposit information to the financial service provider for authorization;
receiving an authorization notification from the financial service provider; and
completing the point-of-sale deposit based on a transfer of funds, wherein the point-of-sale deposit is completed concurrently with a purchase transaction between the customer and a merchant.

19. The system of claim 18, wherein receiving the point-of-sale deposit information comprises scanning a code displayed by the mobile device.

20. The system of claim 18, wherein the point-of-sale deposit is executed on a point-of-sale device.

* * * * *